July 7, 1953
S. J. LORING
2,644,331
VIBRATION MODE ANALYZER
Filed July 11, 1946
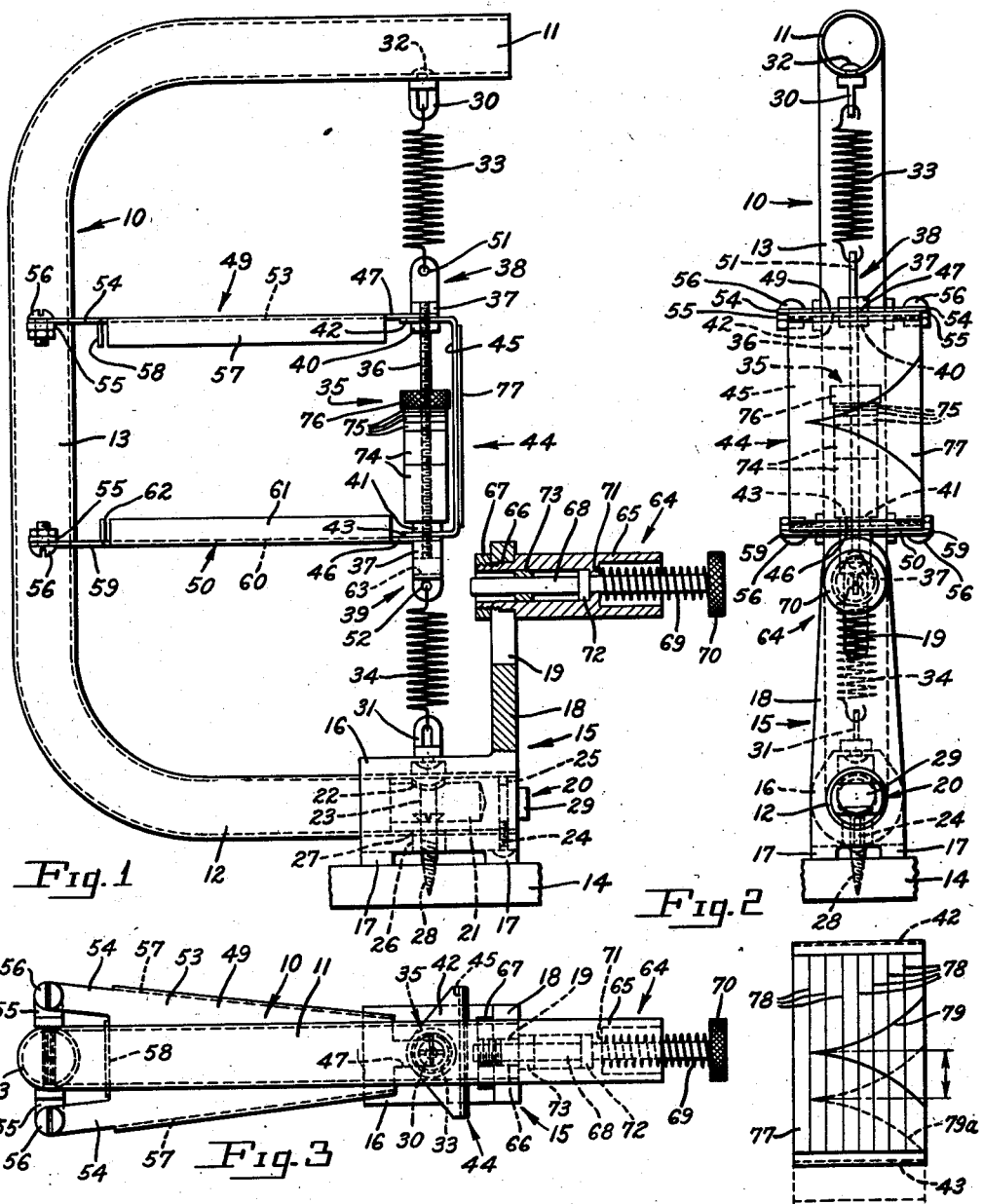
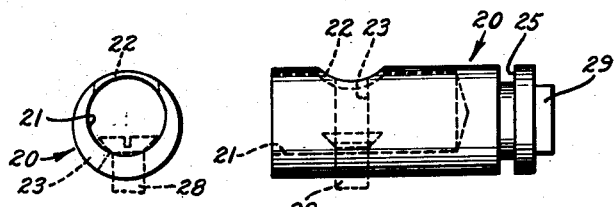
INVENTOR.
SAMUEL J. LORING
BY
ATTORNEY Patented July 7, 1953

2,644,331

UNITED STATES PATENT OFFICE 2,644,331

VIBRATION MODE ANALYZER

Samuel J. Loring, Stratford, Conn.

Application July 11, 1946, Serial No. 682,882

8 Claims. (Cl. 73—67)

This invention relates to new and useful improvements in means for measuring vibration characteristics of structures and has particular relation to a vibration mode analyzer.

An object of the invention is to provide a vibration mode analyzer providing a simple and direct means for measuring the natural frequency and the normal mode deflection shapes and damping characteristics of structures.

Another object is to provide a self-contained instrument or device for the purpose stated and which is relatively small and of light weight, requiring no outside power source, and which is readily operated by one person.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a view partly in side elevation and partly in vertical section showing a device made in accordance with the invention;

Fig. 2 is a front elevational view of the device;

Fig. 3 is a top plan view thereof;

Fig. 4 is a detailed rear elevational view showing a suggested way in which the device may be mounted on a structure to be tested;

Fig. 5 is a side elevational view of the parts shown in Fig. 4; and

Fig. 6 is a front elevational view illustrating a scale means employed.

Referring in detail to the drawing, the device of the invention is shown as including a support generally designated 10 and which latter includes an upper arm 11, a lower arm 12, and a connecting portion 13 integral with said arms. Actually the support 10 is of somewhat the shape of the handle bars of a bicycle or in the shape of a U arranged on one of its arms. The support, as shown, is formed by suitably bending up a piece of metal tubing and comprises a very rigid structure of light weight. When the device of the invention is in use the support 10 is rigidly attached to the structure, the vibration mode of which is to be analyzed.

In the drawing, a portion of such a structure is shown at 14 and this may be a part of a bridge, building, machine, airplane, or any other structure which is to be analyzed. In the drawing, the means for securing the analyzer to the structure or part 14 is generally designated 15 and comprises a tubular body 16 and lugs or feet 17 against the part 14 and a vertically extending arm 18 provided with a longitudinally extending slot 19.

Within the body 16 is a plug-like device 20 having a socket or opening 21 drilled or otherwise formed therein in eccentric relation to the longitudinal center thereof. Thus the part 20 has a tapered or bevelled wall and in the thinnest portion of said wall is an enlarged opening 22 from one edge of which extends a slot 23. It will be appreciated that the opening 22 together with the slot 23 forms a keyhole opening.

The part 20 is disposed within the free end portion of the arm 12 of the support and a screw 24 passing through the body 16 enters a groove 25 in the part 20 whereby the opening 22 and slot 23 are aligned with openings 26 and 27 through the bottom wall of the body 16 and the bottom wall of the arm 12, respectively.

With the described construction, when the analyzer is to be attached to the structure 14, a screw or other means 28 is partly threaded into the said structure. Then the analyzer is disposed on the structure by aligning the openings 26, 27 and 22 with the head of the screw and simply dropping the structure over such head. Thereafter, a wrench or other suitable tool is applied to the flatted or lug-like portion 29 integral with the front end of part 20, and the latter is rotated so as to carry its opening 22 toward its upper side and to move its thickened wall portion under the head of the screw until a tight wedging action is accomplished, as suggested in Fig. 4. At this time the support 10 and all the parts carried by the latter will be rigidly attached to the structure 14.

Suitable perforated lugs or loops 30 and 31 are attached to the inner sides of the arms 11 and body 16, and, as shown, are attached by rivet-like shanks 32, the heads of which are turned over at the inner sides of such arms. Depending from the loop 30 is a coil spring 33 and anchored at its lower end to the loop 31 is a coil spring 34. Thus, these coil springs are secured at their outer ends to the respective arms of the support 10.

At their inner ends, the respective coil springs are connected with the respective upper and lower ends of an elongated loading means generally designated 35. Such means, as here disclosed, includes an elongated threaded screw 36 to the upper and lower ends of which are threaded the inner nut-like portions 37 of a pair of devices 38 and 39 respectively. Thus, the loading means 35 is provided with or mounted by elastic restoring means and so is capable of linear vibrations.

In the actual structure, a pair of nuts 40 and 41 are threaded inwardly from the respective ends of the long screw 36. Next, the upper and lower rearwardly directed parallel arms 42 and 43 of a U-shaped indicator mounting means 44 are passed over the ends of the screw. Such mounting means, in addition to the arms 42 and 43, includes a connecting and face portion 45 of relatively large area.

Now the end portions 47 and 46 of the upper and lower guide means 49 and 50 are passed over the ends of the screw 36. Thereafter, the nut-like portion 37 of the device 38 is threaded onto the upper end of the screw and with the nut 40 serves to clamp the arm portions 42 and 47 rigidly against one another. At the same time, the nut portion 37 of the device 39 being threaded onto the lower end of the screw serves to clamp the arms 43 and 46 rigidly against the nut 41. Thereafter the springs 33 and 34, have their inner ends hooked through the openings 51 and 52 respectively provided in the devices 38 and 39.

The guides 49 and 50 are duplicates of one another but are arranged in reversed relation. Thus, guide 49 is made up of sheet metal and includes a flat body portion 53 having a pair of finger-like portions 54 at its rear end bolted to lugs 55 on the sides of the connecting portion 13 of support 10. The bolts for this purpose are designated 56. Additionally, guide 49 includes depending flange portions 57 along its longitudinal edges and a depending flange portion 58 between the portions 54. At its forward or outer end the guide also includes the portions 47 previously referred to.

Guide 50 includes finger-like portions 59 corresponding with the portions 54 of guide 49 and secured to lugs 55 as by bolts 56. Since the guide 50 is arranged in reverse relation to the guide 49, the side or edge flanges 61 and the end flange 62 of the guide 50 extend upwardly or in the direction of the guide 49 from a flat body portion 60. Both of these guides are formed of metal having the characteristic of resiliency or which is spring-like. However, owing to the provision of the side flanges and the end flanges, it will be apparent that the intermediate or main body portions of the guides are not flexible, but, on the contrary, are quite rigid.

However, while the guides are rigid in their intermediate portions they are flexible and resilient or vibratable in their respective finger-like portions 54 and 59. Such portions provide only for vibration of the guides in directions toward and from one another and toward and from the arms 11 and 12. That is, the guides may vibrate in directions longitudinally of the screw 36. The guides may not vibrate laterally since they are each held or mounted by two spaced finger portions and each in its intermediate portion includes a relatively wide seat-like body 53 on 60.

Later in the description of the operation, the manner of use of the present analyzer will be outlined but here it may be stated that in the use of the device, after it is attached to the structure to be analyzed, the loading means 35 is displaced longitudinally of the springs and then released. I have provided means whereby the weight may be successively released from a predetermined position of displacement.

As here shown, such means includes an opening or socket 63 formed in the spring attaching device 39 together with a plunger structure generally designated 64. This plunger structure includes a cylindrical body 65 having a reduced end portion 66 passing through the slot 19 of the arm 18 and threaded at its free end. A nut 67 is threaded to such end and from Fig. 1 it will be understood that on loosening of this nut, the entire assembly may be adjusted in the direction of the slot 19, to the desired position, and then the nut tightened to secure the assembly in this new position.

Extending longitudinally through the casing 65 is a pin or plunger 68 normally held in the retracted position shown by means of a coil spring 69 disposed about the plunger and at one end bearing against a head 70 of the plunger and the other end against an internal wall 71. Complete withdrawal of the plunger or pin from the casing is prevented by engagement of a shoulder 72 on the former with the wall 71 of the latter. A secondary guide means for the plunger or pin may be provided within the casing, as shown at 73.

After the assembly 64 has been adjusted along the slot 19, the loading means 35 may be displaced downwardly to align the socket 63 with the free or inner end of the pin 68 when the latter is pushed into said socket. This maintains the loading device 35 in a definite position of displacement and it will be understood that when this displacement takes place the spring 33 is further elongated and the spring 34 is permitted to contract while the guides 49 and 50 are flexed downwardly. On release of the hand piece or head 70, spring 69 retracts the plunger or pin withdrawing it from the socket 63, permitting the loading means to be snapped upwardly by the spring 33 and set to vibrating upwardly and downwardly between the arms 11 and 12. Side or lateral motion of the loading means is prevented by the guides 49 and 50, since the latter are not susceptible of such a motion.

The elongated screw 36 of the loading means is adapted to receive a test mass comprising a plurality of weights, such as the relatively large weights 74 and then the very thin weights 75, the latter being added experimentally until the proper mass is secured to the screw 36. The test mass, of course, is a relatively small mass compared with the mass of the structure being tested. A binding nut 76 is provided for securing the weights rigidly in place and against any free movement independent of the screw 36. It will be understood that the weights are preferably of the type having a slot passing through an edge so that they may, simply by lateral movement, be slipped into place on the screw 36.

When using the present analyzer to determine the natural frequency of vibration of a structure, the analyzer is rigidly fastened to the structure at any ventral segment, i. e., at any point on the latter except at a nodal point. The nodal point, as is well known, is the point of a vibrating body marked by absolute or relative freedom from vibratory motion as contrasted with a ventral segment. When using the device for observing amplitudes of movement of loaded means, the device is attached to a structure as described and the loading means displaced and released. As the loading means is displaced and released, it vibrates and carries a chart or scale 77, attached to the front of 45, with it. This chart or scale may be a printed piece of paper attached to 45 or it may have the vertical lines 78 inscribed therein. Also, on the chart there is marked an arrow-shaped indicator 79 which vibrates or moves with the chart, although if the vertical lines are inscribed on the chart 45 then the indicator will likewise be inscribed on such chart.

When the vibration is rapid, an optical illusion is created so that two indicators appear, the dotted line shown at 79a indicating one possible point of appearance of the illusion. The operator determines the amplitude of vibration of the device by observing the movement of the indicator 79 or the distance between the two indicators seen because of the optical illusion, or the lateral depth of the space between the real and the imagined indicator.

The nature and interpretation of the indications of the instrument are best described analytically in terms of the following quantities, the significance of which will be apparent to those skilled in the art:

$N_o$ = natural frequency in cycles per second of loading means 35 with all its attachments on springs 33 and 34 and guides 49 and 50.

$N_s$ = natural frequency in cycles per second of structure 14 being tested.

$m_o$ = effective moving mass of loading means 35 with all its attachments.

$m_s$ = effective mass of structure 14 in its natural vibration mode at point of attachment of frame 10.

$g_o$ = effective damping factor of motion of loading means 35 with all its attachments, measured as the effective fraction of the elastic restoring force which acts 90° out of phase with its motion.

$g_s$ = effective damping factor of structure 14 in its natural mode of vibration, and measured in the same manner as $g_o$.

$r = m_o/m_s$ = ratio of effective mass of loading means 35 with all its attachments to effective mass of structure 14.

$G = (g_s - g_o)/2\sqrt{r}$ = dimensionless parameter further characterizing relation of vibration characteristics of loading means 35 and all its attachments, and structure 14.

$A$ = amplitude of vibration of loading means 35 with all its attachments.

$T = \pi N_o t \sqrt{r}$.

When my device is used in the preferred manner it is attached to a structure which is not vibrating due to any externally applied forces. Small vibrations of the structure are actually introduced by the forces attending the motions of the loading means 35 following its initial release from a displaced position. My device thus acts as a means for exciting small vibrations of a structure being tested as well as a means for measuring the significant features of the vibratory response of the structure to this excitation. The formulae hereinafter given for interpreting the motions of the loading means 35 subsequent to its release apply specifically to this preferred use of my device. It will, however, be apparent to those skilled in the art that similar, but not identical characteristic motions of the loading means 35 would result if vibrations of the structure were excited by some other force or impact applied at any other point of the structure, and that these characteristic motions could also be used to deduce the general vibration characteristics of the structure.

When the frequency $N_o$ is not close to the natural frequency $N_s$ of the structure 14 being tested, the motion of the loading means 35 subsequent to its release from a displaced position has an amplitude which may be read visually on the indicator 77 and which subsides with time $t$ as indicated in the equation:

$$A = e^{-\pi g_o N_o t} \qquad (1)$$

However, when the frequency $N_o$ is just equal to $N_s$ the vibratory motion of loading means 35 subsequent to its release has an amplitude (which again may be observed visually on indicator 77) which varies according to a more complex law which is very decidedly influenced by the specific vibration characteristics $m_s$ and $g_s$ of the structure 14. This law is as follows:

When
$$G < 1.0 : A = \left(e^{-\pi g_o N_o t}\right)\left(e^{-GT}\right)\left[\cos\left(T\sqrt{(1-G^2)}\right) + \frac{G}{\sqrt{(1-G^2)}} \sin\left(T\sqrt{(1-G^2)}\right)\right] \qquad (2a)$$

When
$$G = 1.0 : A = \left(e^{-\pi g_o N_o t}\right)\left(e^{-T}\right)(1+T) \qquad (2b)$$

When
$$G > 1.0 : A = \left(e^{-\pi g_o N_o t}\right)\left(e^{-GT}\right)\left[\cosh\left(T\sqrt{(G^2-1)}\right) + \frac{G}{\sqrt{(G^2-1)}} \sinh\left(T\sqrt{(G^2-1)}\right)\right] \qquad (2c)$$

The responses (represented by formulas 2a, 2b and 2c) which constitute a maximum rate of decay of the free vibration of the test mass may readily be recognized visually on the indicator 77.

According to the Formula 2a the extreme movement or amplitude of the successive vibration cycles of indicator 77 will slowly decrease until the indicator is momentarily at rest. This movement will then increase through a maximum and again decrease to zero, the cycle being repeated until the motion dies out. The Formulas 2b and 2c indicate that the amplitude of vibration will decrease with time more rapidly than would be the case for the motion corresponding to Formula 1.

In determining the natural frequency of a structure, the frame 10 is attached to the structure and the loading means displaced and released so that its vibrations can be observed. This is done successively with a series of weight combinations on the loading means so as to produce a set of closely spaced natural frequencies of the loading means. The course of variation of amplitude of the loading means will, in most cases, correspond to Formula 1. However, when the natural frequency of the loading means becomes equal to a natural frequency of a structure on which the instrument is mounted, one of the characteristic responses represented by Formulas 2a, 2b or 2c will appear and these may be recognized as suggested above.

The parameters $r$ and $G$ will be determined by fitting a graph of the variations of amplitude with time to one of the Formulas 2a, 2b or 2c by adjusting the parameters $r$ and $G$ in these formulas for best fit. It will be apparent to those skilled in the art that there are many simple procedures for carrying out such a step.

The natural frequency of the structure $N_s$ is equal to the value of $N_0$ at which responses of the type (2a, b, c) are observed. A study of the actual response shape leads, by comparison with the various shapes implied by equations (2a, b, c), to a quantitive determination of the parameters $r$ and G from which may be deduced the vibration characteristics $m_s$ and $g_s$ of the structure 14.

The transition from a response of type (2a, b, c) to type represented by Formula 1 takes place in a relatively narrow frequency range of $N_0$, usually within a variation of 2 to 5%. The instrument is capable, therefore, of isolating natural frequencies of a structure which lie relatively close together. A study of relations (2a, b, c) will show that the vibration characteristics of structures for which $r$ has the range 1/100 to 1/100,000, and G the range 0 to 10 are readily observable.

Those skilled in the art will recognize that the reciprocal of the square root of the effective mass of a point of structure in a natural mode may be identified with the deflection of that point in the natural mode. Therefore, by making observations at a number of points of a structure the shape of the deflection curve in the natural vibration mode may be determined.

Having thus set forth the nature of my invention, what I claim is:

1. In an apparatus for the purpose set forth, a support including a pair of spaced rigidly connected substantially aligned upper and lower arms, upper and lower elastic means connected with the respective arms, a loading means, said elastic means connected with said loading means whereby on release of the latter following displacement thereof toward one of said arms it will vibrate back and forth between the arms, means for securing various weights to said loading means, means for holding said loading means in a predetermined position of displacement and for releasing it from such position whereby the loading means may be repeatedly released from the same position of displacement, a scale movable with said loading means and including a series of spaced vertical lines, a pointer on and movable with said scale and extending across said lines, said scale and pointer adapted to vibrate with said loading means whereby through an optical illusion said pointer will appear to occupy two positions with respect to said lines while the loading means is vibrating and the apparent two positions of the pointer with respect to the vertical lines forms the basis for determining the amplitude of vibration of a structure to which the apparatus may be attached, and means for rigidly engaging said apparatus with an object the vibration characteristics of which are to be determined.

2. In an apparatus for the purpose set forth, a rigid support, a loading means, elastic restoring means mounting said loading means on said rigid support whereby the loading means is capable of linear vibrations relative to the support, said loading means comprising a rigid element elongated to have various weights stacked one on another thereon, means on said element and adjustable therealong for rigidly clamping said various stacked weights to said element against movement relative thereto and relative to one another, and means for rigidly attaching said rigid support to a structure the vibration characteristics of which are to be determined.

3. In an apparatus for the purpose set forth, a rigid support, a loading means, elastic restoring means mounting said loading means on said rigid support whereby the loading means is capable of linear vibrations relative to the support, means for securing various weights to said loading means, releasable mechanical means mounted on said support and engageable with said loading means for positively locking said loading means in a predetermined position of adjustment when moved thereto, and means for rigidly attaching said rigid support to a structure the vibration characteristics of which are to be determined.

4. In an apparatus for the purpose set forth, a rigid support, a loading means, elastic restoring means mounting said loading means on said support whereby the loading means is capable of linear vibrations relative to said support, means for securing various weights to said loading means, releasable mechanical means mounted on said support and engageable with said loading means for positively locking said loading means in a predetermined position of displacement when moved thereto, guide means comprising a pair of parallel arms anchored at their respective end portions to said rigid structure and said loading means and flexible in the direction of said linear vibrations, said arms intermediate their anchored respective end portions of channel formation in transverse section whereby they are rigid in all other directions and thereby limit the path of vibration of said loading means, and means for rigidly attaching said rigid support to a structure the vibration characteristics of which are to be determined.

5. In an apparatus for the purpose set forth, a support including a pair of spaced rigid arms and a rigid portion connecting said arms, an elongated loading means located between said arms to have various weights stacked one on another thereon, means threaded on said elongated loading means and threadable therealong to rigidly clamp said various stacked weights against relative movement and against movement relative to said elongated loading means, an elastic means connected at its respective ends to one of said arms and to one end of said loading means, a second elastic means connected at its respective ends to the other of said arms and the other end of said loading means whereby the latter is mounted for movement and will vibrate relative to said arms when displaced and released, and means on one of said arms for rigidly attaching said apparatus to an object the vibration characteristics of which are to be determined.

6. In an apparatus for the purpose set forth, a support including a pair of spaced rigidly connected substantially aligned arms, an elongated loading means located between said arms, an elastic means connected at its respective ends to one of said arms and one end of said loading means, a second elastic means connected at its respective ends to the other of said arms and the other end of said loading means whereby the latter is mounted for movement and will vibrate between said arms when displaced and released, means for clampingly securing various weights on said loading means, a stiff, visually observable indicator means comprising an arrow-shaped pointer at right angles to the path of movement of the loading means and fixed to and movable with said loading means to indicate the amplitude of vibration thereof, and means for rigidly engaging said apparatus with an object the vibration characteristics of which are to be determined.

7. In an apparatus for the purpose set forth, a support including substantially aligned upper and lower arms and a rigid connecting portion rigid with said arms, upper and lower elastic means connected with the respective arms, a loading means, said elastic means connected at their inner ends with said loading means whereby on release of the latter following displacement thereof toward one of said arms it will vibrate back and forth between the arms, guide means comprising a pair of parallel guide arms anchored at their respective end portions to said connecting portion of the support and said loading means and flexible only in directions toward and from said arms, said parallel guide arms intermediate their anchored respective end portions of channel formation in transverse section whereby they are rigid in all but said back and forth directions and thereby limit said back and forth vibrations to a predetermined path, means for securing various weights to said loading means, releasable mechanical means mounted on said support and engageable with said loading means for positively locking said loading means in a predetermined position of displacement when moved thereto, and means for rigidly engaging said apparatus with an object the vibration characteristics of which are to be determined.

8. In an apparatus for the purpose set forth, a rigid support, a loading means, elastic restoring means mounting said loading means on said rigid support whereby the loading means is capable of back and forth linear vibrations, means limiting the vibrations of said loading means to substantially a fixed path, means for securing various weights to said loading means, a post extending along said path, releasable mechanical means mounted on said post for positively locking said loading means in a predetermined position of displacement when moved thereto, means mounting said locking means on said post for adjustments longitudinally of the latter, and means for rigidly attaching said rigid support to a structure the vibration characteristics of which are to be determined.

SAMUEL J. LORING.

References Cited in the file of this patent

UNITED STATES PATENTS

| Number | Name | Date |
|---|---|---|
| 1,687,507 | Perkins | Oct. 16, 1928 |
| 1,998,727 | Rolland | Apr. 23, 1935 |
| 2,058,106 | Prescott et al. | Oct. 20, 1936 |
| 2,067,803 | Thearle | Jan. 12, 1937 |
| 2,086,537 | Cordero | July 13, 1937 |
| 2,237,326 | Barry | Apr. 8, 1941 |
| 2,305,783 | Heymann et al. | Dec. 22, 1942 |
| 2,353,492 | O'Connor | July 11, 1944 |

FOREIGN PATENTS

| Number | Country | Date |
|---|---|---|
| 245,805 | Great Britain | Jan. 20, 1927 |